United States Patent [19]

Eason

[11] 4,047,423
[45] Sept. 13, 1977

[54] LEAK DETECTOR FOR ENGINE CHAMBERS

[76] Inventor: Celvie L. Eason, 621 W. 43 Place, Hialeah, Fla. 33012

[21] Appl. No.: 725,015

[22] Filed: Sept. 20, 1976

[51] Int. Cl.² .......................................... G01M 3/02
[52] U.S. Cl. ..................................... 73/49.8; 73/40; 116/114 P
[58] Field of Search ............... 73/40.7, 46, 40, 47, 73/49.2, 49.8; 116/114 P, 40, 47, 49.8

[56] References Cited

U.S. PATENT DOCUMENTS

| | | | |
|---|---|---|---|
| 2,468,050 | 4/1949 | Dwyer et al. | 73/47 |
| 3,030,800 | 4/1962 | Dega | 73/46 X |
| 3,859,845 | 1/1975 | Sawyer | 73/40 |
| 3,950,983 | 4/1976 | Slinger | 73/46 |
| 3,969,924 | 7/1976 | Grove | 73/46 |

FOREIGN PATENT DOCUMENTS 713,046  10/1931  France ................................. 73/47

*Primary Examiner*—Daniel M. Yasich
*Attorney, Agent, or Firm*—C. A. Phillips

[57] ABSTRACT

A leak detector for checking leakage of passageways in automotive engines which applies a pressure to a passageway and detects leakage, the detector including two parts which seal opposite sides of a passageway and a connecting member which extends through the passageway and sealably holds these parts in place.

1 Claim, 2 Drawing Figures

LEAK DETECTOR FOR ENGINE CHAMBERS

BACKGROUND OF THE INVENTION

1. Field of the Invention

This invention relates to leak detectors, and particularly to a detector which is adapted to detect leakage from passageways in automotive engines.

2. General Description of the Prior Art

Various devices have been constructed for the measurement of leakage in automotive engine components. Among these are cylinder pressure gauges used to detect leaks in fully assembled engines. The problem with these is that they often do not enable one to pinpoint the place of leakage. Other devices have been devised to determine leaks in particular ports or engine chambers, but the difficulty with these is that a wide variety of devices is required which is, of course, expensive, and even then a correct device is not always available.

It is the object of the present invention to overcome these difficulties.

SUMMARY OF THE INVENTION

The applicant has discovered that by providing multiple angular coupling means between the capping end pieces of a detector, a single detector with few auxiliary components are entirely adequate to provide leakage testing for a wide variety of engine components of a variety of engines.

In accordance with the invention, a leak detector is constructed of three basic components. One is a pressure application chamber having a pressure gauge, a valve for injecting air, and at least three threaded chambers, each being discretely at an angle with respect to a sealing end of the chamber adapted to fit over a chamber to be tested. The second component is an end seal, or plug, adapted to be placed over the opposite end of the passageway. The third component is a threaded rod which extends through the passageway between the first two components to secure them together. It utilizes one of the threaded passageways of the first component, the selection being based upon the angle which the first component must make with the axis of the passageway and orientation of the surface seal provided by the second component.

DETAILED DESCRIPTION OF THE DRAWINGS

Figure 1:
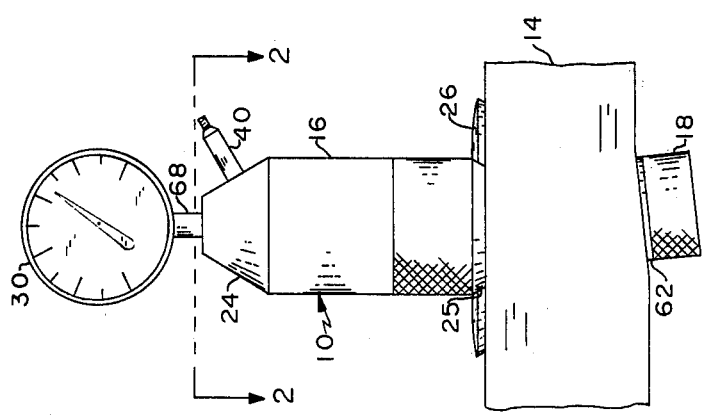
FIG. 1 is an elevational view of an embodiment of the invention as actually employed.

FIG. 1 shows leak detector 10 in place as it is used to check leakage of injector sleeve 12 (FIG. 2) formed in cylinder 14 of a diesel engine (not shown). The tool includes two parts, an upper cylindrical body 16 sealably attached over one end of injector sleeve 12, and a sealing plug, or cap 18 over the opposite end 20 of injector sleeve 12. The two bodies are secured in place by an elongated draw rod 22 shown in FIG. 2, to be further described. The upper body is formed into a truncated cone configuration 24 at the top end and is provided with a beveled region 25 around the lower perimeter so as to provide clearance between the upper body member and certain obstructions, such as a cluster of valves 26, which may not be removed from cylinder head 14 during testing. The upper body member 16 includes an interior air cylinder, or cylindrical pressure chamber 28, through which air is injected into injector sleeve 12 and the pressure of which is observed by pressure gauge 30, also interconnected to inner pressure chamber 28.

As is also shown in FIG. 1, the upper body and lower plug may be sealably connected between divergent surfaces 32 and 34 of cylinder head 14 in a manner which illustrates one particular feature of the tool.

Figure 2:
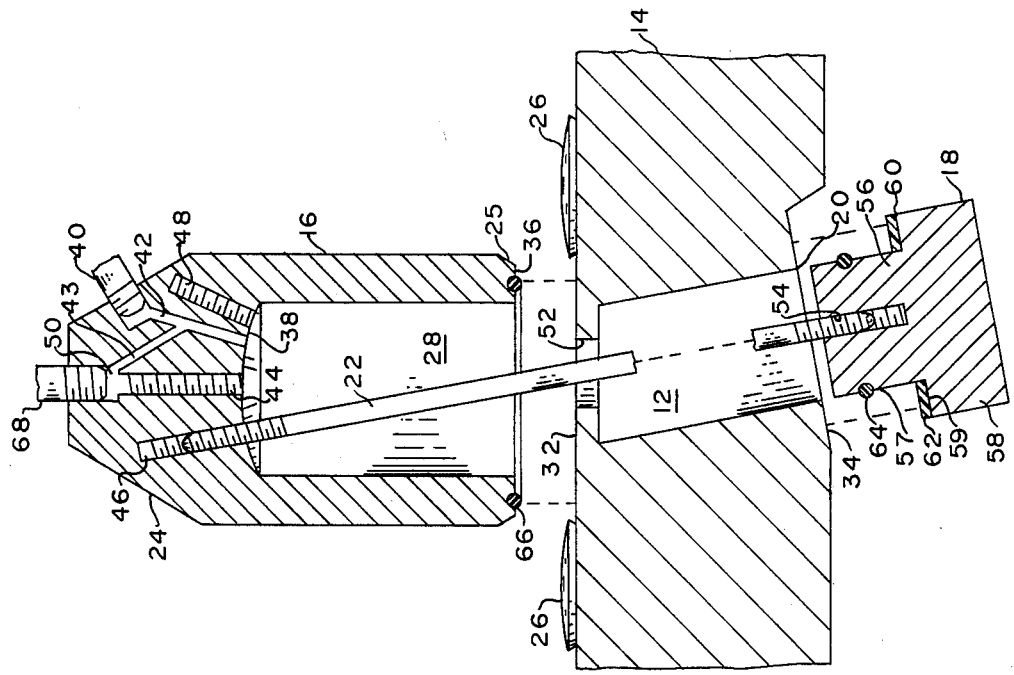
FIG. 2 is a sectional view taken with one-half of FIG. 1 cut away and enlarged in scale. It also illustrates an alternate form for the lower sealing cap member of the embodiment of the invention.

FIG. 2 is an elevational view, in section, of tool 10 and cylinder head 14. A cylindrical chamber 28 is formed inward of lower end 36 of cylindrical body 16 which extends somewhat more than half the length of the body 16 and is terminated at the inner end by a conical dome 38. Air pressure is coupled into the inner cylindrical chamber by way of air valve 40 and a passageway 42 which is also interconnected with a second passageway 43 which feeds air to pressure gauge 30. In this way, air pressure in the pressure chamber is coupled to air pressure gauge 30. Three separate threaded sockets 44, 46, and 48 are provided in the upper dome 38 of cylinder 28 which enables cap 18 to be sealably attached to a particular inclined lower surface 34 of cylinder head 14. One threaded hole 44 is formed into the bottom surface of gauge attachment hole 50 and is aligned with the longitudinal axis of cylindrical body 16. A second socket 46 is displaced at an angle of 12° from the central axis of body 16 while the second attachment socket 48 is displaced at an angle of 14° from the central longitudinal axis. As is illustrated in FIG. 2, draw rod 22 is secured in 12° socket 46 and is inserted through an opening 52 at the top of injector sleeve 12 and is attached to a threaded socket 54 centrally formed in solid body 56 of cap member 18. Solid cap 18 is reduced in diameter at its upper end 57 so as to freely accept inner perimeter of injector sleeve 12. The lower end region 58 is provided with a circular plane 59 about the upper perimeter 60 which is adapted to receive a rubber seal 62. Alternatively, an O-ring 64 may be placed around plug, or cap 18 so as to engage the inner surface of injector sleeve 12, either or both of which can provide a gas-type seal.

It is readily seen from FIG. 2 that if the upper and lower surfaces of the cylinder head are parallel, then draw rod 22 of an appropriate length would be coupled between axially aligned socket 44 of cylindrical body 16 and cap 18. Further, it is seen that if the lower surface is inclined at an angle of 14° with respect to the upper surface of cylinder head 14, then the draw rod would be coupled between socket 48, which is displaced 14° from the central longitudinal axis and cap 18. The upper body is sealably joined to the upper surface 32 of cylinder head 14 by O-ring 66 which is supported within a semi-circular groove formed about the lower surface 36 of upper body 16. Air pressure gauge 30 is attached to cylindrical body 16 by threaded nipple 68, which is threaded into the mounting hole 50 formed into the upper surface of body 16. In use, the tool would be installed as shown in FIG. 1. Pressure chamber 28 would then be pressurized to a predetermined pressure, and the pressure would be observed over a selected period of time to determine whether any leakage occurs from injector sleeve 12. This would be indicated, of course, by the lowering of pressure within the pressure chamber.

What is claimed is:

1. A leak detector for detecting leakage in a passageway comprising:
- a sealing cap adapted to fit against and seal one end of a passageway, and including means for attaching a rod to said cap and oriented to pass through and extend out of the opposite end of the passageway;
- an elongated rod threaded on one end, and including attachment means at the opposite end for attachment to said sealing cap;
- a pressure application and measurement enclosure assembly comprising:
- a generally cylindrical-shaped chamber having regions with an open end and a closed end, and a sealing ring adapted to fit around said open end, and sealably coupling said open end to said passageway,
- said closed end region of said chamber including a plurality of threaded sockets adapted to receive said threaded end of said rod, one of said threaded sockets being concentric and extending along a line normal to said open end of said chamber, one of said sockets being at an angle of 12° with respect to a line parallel to said axis of said first-named socket, and one of said sockets being positioned at an angle of 14° with respect to a line parallel to said first-named socket,
- a pressure gauge coupled to the interior of said chamber, and
- pressure valve means coupled to the interior of said chamber for selectively applying gas pressure to and releasing gas pressure from the interior of said chamber;
- whereby said rod may be passed through said passageway and selectively inserted into one of said sockets at an appropriate angle, and then said rod tightened to effect an aligned seal between said cap and an end of a said passageway.

* * * * *